A. B. SPIES.
Wheel Cultivator.
No. 84,588.
Patented Dec. 1, 1868.
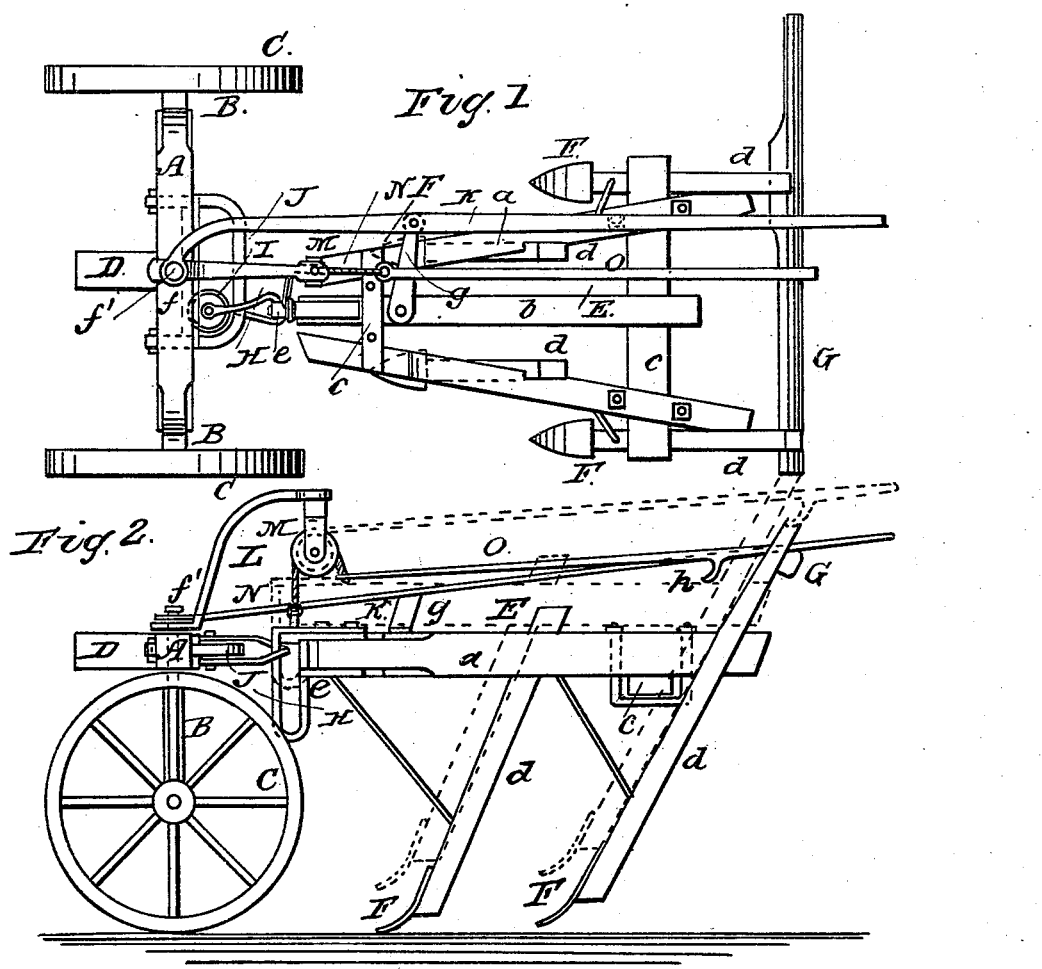

A. B. SPIES, OF STERLING, ILLINOIS, ASSIGNOR TO JOHN K. JOURNEY, OF THE SAME PLACE.

Letters Patent No. 84,588, dated December 1, 1868.

IMPROVEMENT IN CULTIVATORS.

The Schedule referred to in these Letters Patent and making part of the same.

*To all whom it may concern:*

Be it known that I, A. B. SPIES, of Sterling, in the county of Whitesides, and State of Illinois, have invented a new and improved Cultivator; and I do hereby declare the following to be a full, clear, and exact description thereof, which will enable others skilled in the art to make and use the same, reference being had to the accompanying drawings, forming a part of this specification.

This invention relates to a new and improved cultivator, for plowing or cultivating those crops which are grown in hills or drills, and which cultivators are constructed in such a manner as to admit of a lateral movement of the plow-beams, so that the plows may conform to the sinuosities of the rows of plants, and also be readily raised out of the ground when required, and held in a raised position while the machine is being drawn from place to place.

In the accompanying sheet of drawings,

Figure 1 is a plan or top view of my invention.

Figure 2 is a side view of the same.

Similar letters of reference indicate corresponding parts.

A represents an axle, having a pendent crank-arm, B, at each end of it, and

C C are wheels which are fitted on said arms.

D is the draught-pole, attached centrally to the axle A.

E is a frame, composed of three bars, *a a b*, connected by cross-bars *c*, the side bars *a a* having an oblique position, so that the front part of the frame will be narrower than the rear part, as shown clearly in fig. 1.

The side bars *a a* have standards *d d* attached to them, two to each, and these standards have ordinary shovels or shares F secured to their lower ends.

The rear standards *d* extend upward above the frame E, and have a cross-bar, G, attached to them, which cross-bar serves as a handle.

To the front end of the central bar *b* of the frame E, there is attached a clevis, *e*, in which a link, H, is fitted, said link having a roller, I, secured in it.

This roller is fitted within a metal yoke, J, secured to the rear side of the axle A, the front part of the roller working in a slot, *f*, in the rear side of the axle, the yoke J retaining the roller in the slot.

By this mode of connecting the frame E to the axle A, the roller I is allowed to move or travel the length of the yoke J, and consequently a lateral movement is allowed E and the shovels or shares, in order that the latter may be made to conform to the sinuosities of the rows of plants.

The frame E is thus moved through the medium of a lever, K, the fulcrum-pin *f* of which is in the axle A, said lever being connected to the frame E by a link, *g*, and extending back over and beyond the bar G.

L is a curved bar, attached to the axle A, and projecting backward over the front part of the frame E.

The upper end of this bar L has a swivel-pulley, M, attached to it, over which a rope or chain, N, passes, the front end of the latter being attached to the front end of the frame E, and the rear end attached to a bar, O, provided with a hook-projection, *h*.

By this arrangement, obstructions may be readily passed over, as the front part of the frame E may be elevated by drawing back the bar O, and the front shovels or shares raised out of the ground, the rear ones being raised by pulling upward on the bar G.

In drawing the device from place to place, the shovels or shares may be held above the surface of the ground by drawing back the bar O and allowing the hook *h* to catch on the bar G, as shown in red in fig. 2.

Having thus described my invention,

What I claim as new, and desire to secure by Letters Patent, is—

1. Connecting the frame E to the axle A by means of the roller I, link H, yoke J, and clevis *e*, all arranged as and for the purpose set forth.

2. The lever K, applied to the frame E and axle A, in the manner substantially as and for the purpose set forth.

3. The curved bar L, attached to the axle A, swivel-pulley M, clevis *e*, rope or chain N, and bar O, all combined and arranged to operate in the manner substantially as and for the purpose set forth.

Witnesses:             A. B. SPIES.

JOHN K. JOURNY, Jr.,
  JOHN R. CLARK.